March 15, 1966  A. D. ROSE  3,240,100
DRIVE PIN
Filed May 9, 1963  2 Sheets-Sheet 1
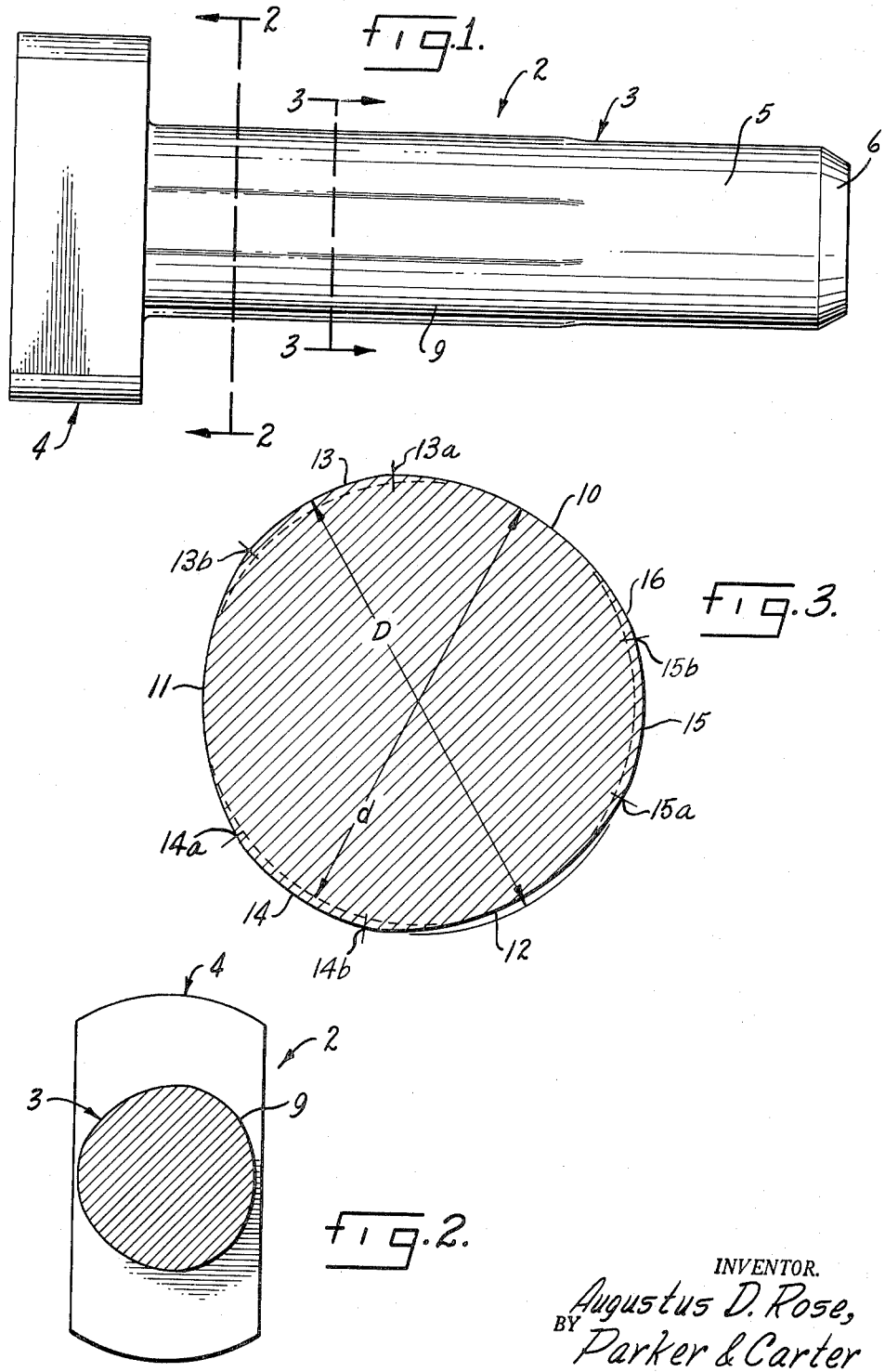
INVENTOR.
Augustus D. Rose,
BY Parker & Carter
Attorneys.

March 15, 1966
A. D. ROSE
3,240,100
DRIVE PIN
Filed May 9, 1963
2 Sheets-Sheet 2
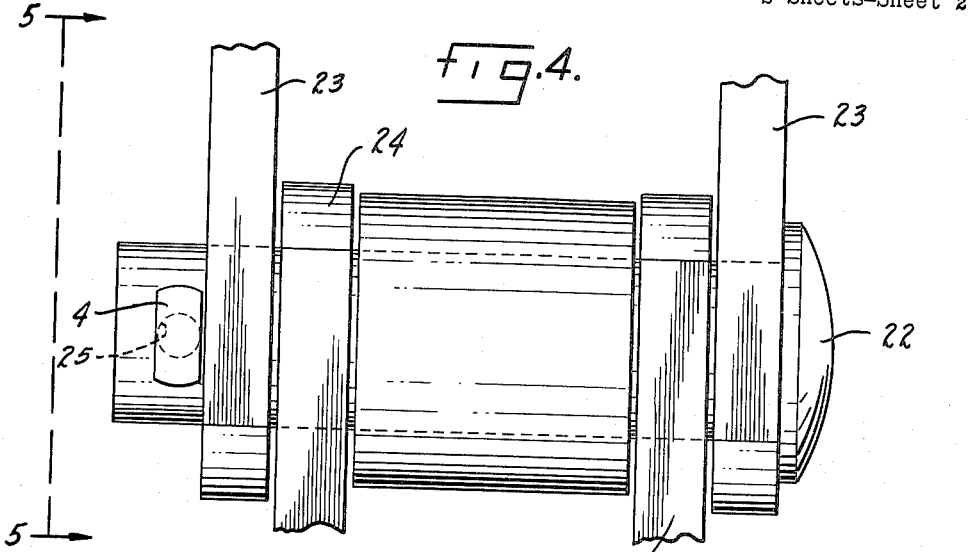
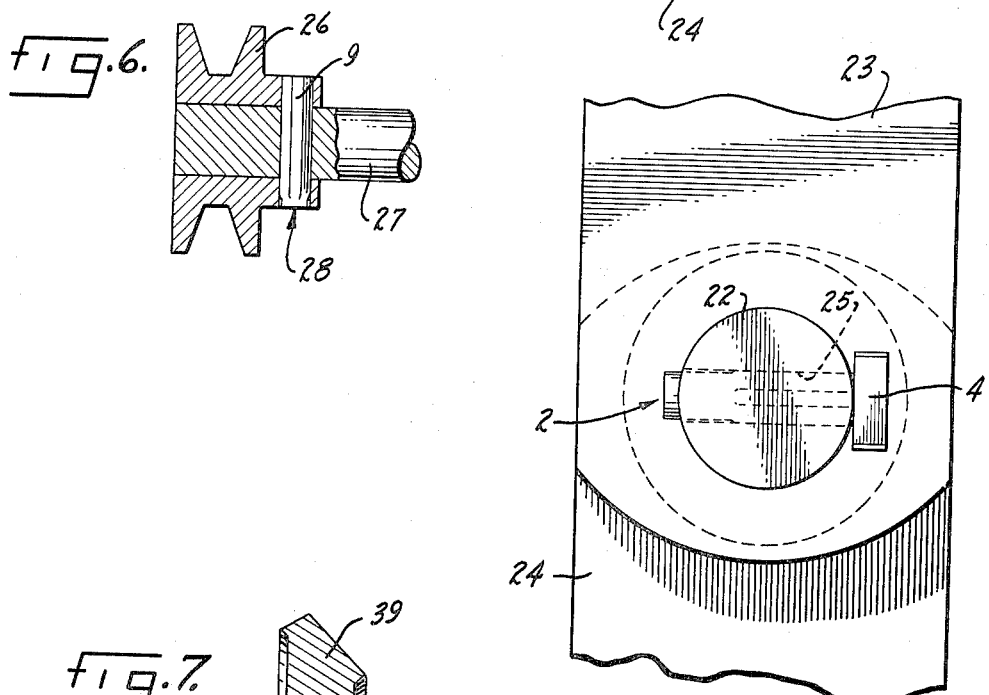
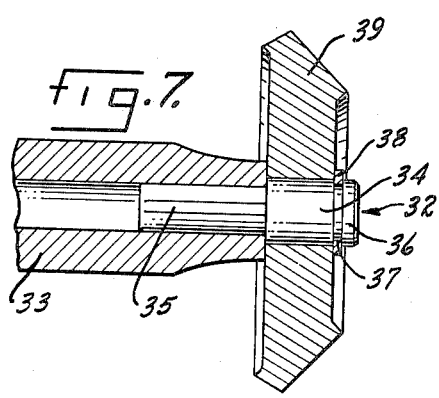
INVENTOR.
Augustus D. Rose,
BY Parker & Carter
Attorneys.

United States Patent Office 3,240,100
Patented Mar. 15, 1966

3,240,100
DRIVE PIN
Augustus D. Rose, Windsor, Conn., assignor to Standard Screw Company, Bellwood, Ill., a corporation of New Jersey
Filed May 9, 1963, Ser. No. 279,130
5 Claims. (Cl. 85—19)

This invention relates to a drive pin having a plurality of lobular areas of generally constant radius adapted to be placed in a compression fit with an axially extending hole, and is a continuation in part of my copending application Serial No. 66,158, filed October 31, 1960 and now abandoned.

A primary purpose of the invention is a drive pin of the type described which provides a simple and inexpensive press fit pin connection for replacing cotter pins, keys, rivets, bolts, dowel pins and the like.

Another purpose is a drive pin of the type described which can be manufactured by a simple forming process such as extrusion, cold drawing or the like.

Another purpose is a drive pin connection which requires a straight hole, either drilled or cast, eliminating reaming, tapping, milling or the like, required for other types of pin fasteners.

Another purpose is a drive pin of the type described which can be manufactured in a variety of cross sectional configurations.

Another purpose is a drive pin connection of the type described in which the pin can be reused.

Another purpose is a drive pin which can be easily and inexpensively manufactured to close tolerances.

Other purposes will appear in the ensuing specification, drawings and claims.

The invention is illustrated diagrammatically in the following drawings wherein:

FIGURE 1 is a side elevation of a drive pin of the type described,

FIGURE 2 is a section along plane 2—2 of FIGURE 1,

FIGURE 3 is an enlarged section along plane 3—3 of FIGURE 1,

FIGURE 4 is a plan view of a portion of a chain link assembly showing the drive pin of FIGURE 1 in use, FIGURE 5 is a view taken along plane 5—5 of FIGURE 4, FIGURE 6 illustrates a modified form of drive pin, and FIGURE 7 illustrates still a further modified form of drive pin.

FIGURES 1–3 illustrate one form of drive pin. In this case, the pin is adapted for use in a round hole, which may be drilled or cast, and consequently the basic shape of the pin itself is round. However, it should be understood that virtually any cross sectional shape may be used for the pin, depending upon the corresponding shape of the hole in which it is to be used. This particular form of pin is indicated generally at 2 in FIGURE 1. The drive pin 2 includes a shank 3 and a head 4.

The shank 3 may include a lead-in or pilot section 5 having a bevel 6 formed at its end. The pilot 5 may be circular in cross section in this case, in keeping with the cross sectional configuration of the hole. Preferably the pilot section 5 has a predetermined constant diameter. This diameter is identified as "d" in FIGURE 3 and is generally pre-established at slightly less than the inside diameter of the hole into which the drive pin is to be inserted.

The drive pin may include a working section 9 which is a part of the shank and is between the shank and the head 4. As best seen in FIGURE 3, the basic diameter "d" of the lead-in section 5 is preserved over the length of the shank in three radially recessed areas 10, 11 and 12.

The areas 10, 11 and 12 have a generally constant radius throughout a major portion of their areas. Positioned between the areas 10, 11 and 12 are contact lobes 13, 14 and 15, each of which has a generally constant radius from points 13a, 14a and 15a over to points 13b, 14b and 15b. The major portion of the lobes has a generally constant radius and this constant radius portion may be somewhat the same in arcuate length as the constant radius portions of the areas 10, 11 and 12. Each of the lobes gradually merges into the recessed areas 10, 11 and 12 as illustrated at 16. The diameter "D" of the lobes 13, 14 and 15 will be generally slightly larger than the inside diameter of the hole receiving the drive pin. The number of lobes may vary although in no case will there be less than three. The number of lobes may depend upon the size of the drive pin.

The drive pin may be manufactured by a simple and inexpensive forming process from a steel alloy. The process utilized in this case is extrusion but it is conceivable that cold drawing or a "bump-up" process might also be used. The steel alloy is sufficiently soft to permit a certain amount of deformation or extrusion of the lobes of the pin as it is inserted in a hole. The invention should not be limited to steel alloys. Any of a number of ferrous or non-ferrous alloys may be utilized in the manufacture of these drive pins, depending upon their facility for being formed and their deformation characteristics. It is also possible that non-metallic materials having certain elastic characteristics might be utilized in specific instances.

By forming the shank 3 in the foregoing manner, the basic pin diameter "d" and the outside diameter "D" of the lobes 13, 14 and 15 can be easily and inexpensively established with a high degree of accuracy. No additional machining is required. The head 4 in this type of pin may normally be formed by a cold upset process. It is a simple and inexpensive operation, although it is not always necessary to have a head on the drive pin.

FIGURES 4 and 5 show the drive pin utilized as a cotter pin or key in a chain link assembly. A link pin 22 connects chain links 23 and 24 and has a conventional keyhole 25 extending transversely through the free end of the pin. The pin 2 is seated in hole 25 and acts as a key to prevent accidental removal of the link pin 22.

In FIGURE 6, a pulley 26 and shaft 27 are connected with a headless drive pin 28. In addition to being headless, the drive pin 28 has its working section 9 extending substantially the entire length of the pin shank.

In FIGURE 7 a pin 32 is shown seated in a supporting shaft 33 composed of an alloy having relatively low hardness. The pin has an upset bearing section 34 formed between the working or lobe carrying section 35 and head 36, which is separated from the bearing section 34 by snap ring recess 37 in which a snap ring 38 is seated. A bevel gear 39 is adapted for rotation on the bearing surface 34. In this form of the drive pin, the bearing surface must be sufficiently hard to provide good wearing life since it supports the bevel gear for rotation. Consequently, the drive pin is treated to harden the outer surface. The working section and lobes 13, 14 and 15, being hardened in the process, establish a press fit in the pin receiving hole by deforming the inner surface of the hole to a greater extent than the lobes of the pin.

The invention should not be limited to any particular cross sectional shape of pin. A square pin with lobes on each of its square or flat faces would find use where square rather than round pin receiving holes were required. Similarly, a pin having a triangular cross section or semi-circular cross section with approximately placed lobes may be used.

The use, operation and function of the invention are as follows:

The drive pin is selected so that the smaller diameter "d" or the diameter between the lobes is slightly less than the diameter of the hole into which it will be inserted. The diameter "D" of the lobes is slightly larger than the diameter of the hole. Considering first a drive pin made of ordinary low carbon steel such as SAE 1010 or 1020, or a similar low carbon steel, if this pin is driven into a hole in a steel part which has been heat-treated to a considerably higher tensile strength than the pin, then the hole will not deform when the pin is driven in. The lobes of the pin being larger than the hole will deform when driven into the higher tensile material. This deformity will result in actual cold flow or permanent displacement of some of the lobe material into the area between the lobes. If the drive pin is then removed from the hole, it does not spring back to its normal shape. There will however be some springback, a very minor amount. This springback will make the pin, when removed from the hole, larger in diameter than the hole. To this extent the pin may be re-used.

On the other hand, if the drive pin is made of an alloy steel and heat-treated to a high tensile strength and is then driven into a hole formed in a piece of low carbon steel, again such as SAE 1010 or 1020, the result is entirely different. The pin being of substantially higher tensile strength, when driven into the hole, will deform the hole by cold flowing the material permanently into the space between the lobes of the drive pin. When the pin is removed from the hole, the pin will retain its original shape, but the hole will be deformed. Again there may be some springback of the material forming the hole. A new pin of exactly the same size as the original may be driven into the hole, but it is preferred that the pin be indexed so as to strike new areas of the hole.

In a third case, if the drive pin has the same tensile strength as the material into which it is driven, then there will be extrusion or cold flow of both the material in the pin and the material in the hole, both of approximately the same amount.

In general, the drive pin of this invention is not designed to be driven into a thin-walled hole. Instead, it is designed to be driven into a rather thick wall section which will not be distorted on the outside.

The lobes have a generally constant radius throughout a major portion of their arcuate length to provide substantial contact area. These portions of constant radius may be generally equal in arcuate extent to the portions of the recessed areas having a generally constant radius. This relationship is not essential although it is advantageous. The number of lobes may vary greatly, although in no case will there be less than three.

It is preferred that the tolerance on the pin be such that the force required to remove the pin is generally equal to the strength of the pin to provide maximum resistance to pin removal. For example, with a tolerance of .003 inch on the outer diameter of the lobes and with a tolerance of .005 inch on the hole drilling and utilizing a minimum interference of .005 inch on the hole drilling and utilizing a minimum interference of .001 inch, there is a total of .009 inch possible interference under extreme conditions. With an interference of .009 inch it takes approximately as much force to insert the pin or to remove it as there is strength in the pin material.

The length of the pilot section may vary considerably and in the form shown in FIGURE 6 the pilot section is merely beveled at the end with almost no lead-in area. It is advantageous to have a pilot section at the end for ease in inserting the pin.

What has been shown and described is a drive pin adapted for compression fit in a hole having a generally corresponding configuration. The pin, whether round, elliptical, square or otherwise shaped, can be extruded and, if necessary or required, a head cold upset on one of its extremities. By limiting the number of operations necessary to form a pin of this type, the cost and time of manufacture are substantially reduced. In some instances a non-metallic pin or plastic or the like may be used.

Whereas the preferred form of the invention has been shown and described herein, it should be realized that there are many modifications, substitutions and alterations thereto, within the scope of the following claim.

I claim:
1. A drive pin adapted to be seated in compression fit in an axially extending hole having a cross section of generally constant configuration and dimension, including a shank having a working section and a pilot section, said pilot section being smooth and generally cylindrical, said working section having at least three axially extending outstanding lobes with the outer diameter of the lobes being greater than the diameter of the axially extending hole and greater than the diameter of the pilot section, the outer surface of each lobe being a convex surface having major portions of constant radius measured from the shank axis, the areas between lobes having a diameter less than that of the axially extending hole and generally equal to that of the pilot section with major portions of said areas having a convex surface with a constant radius measured from the shank axis, said lobe portions of generally constant radius being generally equal in arcuate length to the arcuate length of said area of generally constant radius, with said lobe portions gradually merging into said areas.

2. The structure of claim 1 further characterized in that said drive pin is formed of a steel alloy.

3. The structure of claim 1 further characterized in that said drive pin is formed of a steel alloy treated to a predetermined surface hardness such that when said pin is forced into the axially extending hole the means forming the hole tend to deform and extrude into radially recessed areas to establish a compression fit with the pin.

4. The structure of claim 1 further characterized in that said drive pin is formed of a metallic material which deforms beyond its elastic limit when driven into the axially extending hole.

5. The structure of claim 4 further characterized in that said drive pin both extrudes and has elastic flow when driven into the axially extending hole.

References Cited by the Examiner

UNITED STATES PATENTS

| | | | |
|---|---|---|---|
| 456,723 | 7/1891 | Harvey | 85—19 |
| 487,344 | 12/1892 | Capewell | 24—108 |
| 1,686,468 | 10/1928 | Rosenberg | 85—19 |
| 2,194,458 | 3/1940 | Eckler. | |
| 2,279,955 | 4/1942 | Sipe. | |
| 2,972,223 | 2/1961 | Devonshire | 85—19 |

EDWARD C. ALLEN, *Primary Examiner.*